United States Patent
Kim (10) Patent No.: US 8,758,965 B2
(45) Date of Patent: Jun. 24, 2014

(54) APPARATUS AND METHOD FOR MANUFACTURING COLOR FILTER ADSORBING TONER NANO PARTICLES BY USING ELECTROSTATIC FORCE

(75) Inventor: Tae Gyu Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1884 days.

(21) Appl. No.: 11/440,023

(22) Filed: May 25, 2006

(65) Prior Publication Data

US 2007/0065735 A1    Mar. 22, 2007

(30) Foreign Application Priority Data

Sep. 22, 2005    (KR) .................. 10-2005-0088357

(51) Int. Cl.
G02B 5/20    (2006.01)

(52) U.S. Cl.
USPC ............... 430/7; 430/31; 430/945; 347/115; 347/129

(58) Field of Classification Search
None
See application file for complete search history.

(56) References Cited

U.S. PATENT DOCUMENTS

| | | | |
|---|---|---|---|
| 4,650,734 A * | 3/1987 | Molaire et al. ................. | 430/7 |
| 5,066,512 A | 11/1991 | Goldowsky et al. | |
| 2004/0072084 A1 * | 4/2004 | Lo et al. ........................ | 430/7 |

FOREIGN PATENT DOCUMENTS

| | | |
|---|---|---|
| EP | 1243971 | 9/2002 |
| JP | 1992.333801 | 11/1992 |
| JP | 6-043315 A * | 2/1994 |
| JP | 1994-043315 | 2/1994 |
| JP | 06-265712 | 9/1994 |
| JP | 6-281809 A * | 10/1994 |
| JP | 7-281175 A * | 10/1995 |
| JP | 1995.281175 | 10/1995 |
| JP | 1996-154619 | 2/1996 |
| JP | 1996-299878 | 11/1996 |
| JP | 2001-183519 | 7/2001 |
| JP | 2001-307991 | 11/2001 |
| JP | 2002-307002 | 10/2002 |
| JP | 2002-353091 | 12/2002 |
| JP | 2004-186419 | 7/2004 |
| JP | 2005-011996 | 1/2005 |
| KR | 1020020082794 | 10/2002 |

OTHER PUBLICATIONS

Computer-generated translation of JP 7-281175 (Oct. 1995).*
Computer-generated translation of JP 6-043315 (Feb. 1994).*
Computer-generated translation of JP 6-281809 (Oct. 1994).*

* cited by examiner

*Primary Examiner* — John A. McPherson
(74) *Attorney, Agent, or Firm* — Staas & Halsey LLP (57) ABSTRACT

Provided is an apparatus and method of manufacturing a color filter adsorbing toner nano-particles by using electrostatic force. In the apparatus for manufacturing the color filter, a laser driver generates at least one laser control signal according to electrification data, at least one laser device forming a laser irradiation unit which irradiates a laser for a predetermined time according to the at least one laser control signal. According to the irradiated laser, electrostatic latent images are formed in positions of color filter cells having a predetermined resolution standard requirements in a glass substrate, and toner nano-particles are electrostatically adsorbed to the formed electrostatic latent images.

21 Claims, 7 Drawing Sheets

APPARATUS AND METHOD FOR MANUFACTURING COLOR FILTER ADSORBING TONER NANO PARTICLES BY USING ELECTROSTATIC FORCE

CROSS-REFERENCE TO RELATED APPLICATION

This application claims the benefit of Korean Patent Application No. 10-2005-0088357, filed on Sep. 22, 2005, in the Korean Intellectual Property Office, the disclosure of which is incorporated herein in its entity by reference.

BACKGROUND OF THE INVENTION

1. Field of the Invention

The present invention relates to an apparatus for manufacturing a color filter, and more particularly, to an apparatus and method of manufacturing a color filter adsorbing toner nano-particles instead of paint or dye drops (hereinafter, referred to as ink) to a glass substrate by electrostatic force in order to form a color filter cell in a uniform thickness at a precise position.

2. Description of the Related Art

Figure 1:
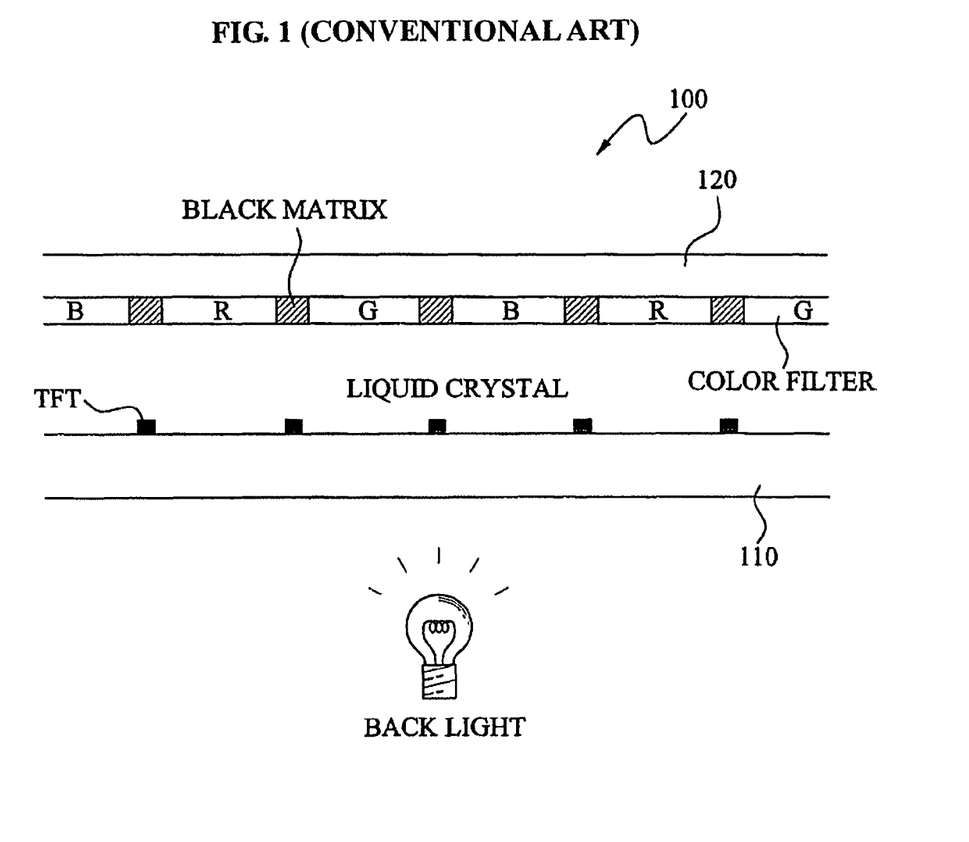
FIG. 1 is a diagram illustrating the use of a color filter in a general LCD panel.

FIG. 1 is a diagram illustrating the use of a color filter in a general thin film transistor-liquid crystal display) TFT-LCD panel 100. In a general TFT-LCD, the TFT-LCD panel 100 is used for receiving image data and displaying a certain image to be shown to a user. The TFT-LCD panel 100 may be used in various devices for displaying a certain image, such as mobile phones, digital cameras, computer screens, and television screens.

The TFT-LCD panel 100 includes a lower plate 110 and an upper plate 120, both of which include a plurality of electrodes for forming an electric field. A crystal liquid layer is formed between the lower plate 110 and the upper plate 120. In addition, polarization plates attached to each of the lower plate 110 and the upper plate 120 may be included in order to polarize light. The brightness of light in the TFT-LCD panel 100 is controlled by applying a voltage according to gray level to a pixel electrode for rearranging liquid molecules. In the lower plate 110 of the TFT-LCD panel 100, in order to apply the gray level voltage to be applied to pixel electrodes, a plurality of switching devices such as TFTs connected to the pixel electrodes is included. In the upper plate 120 of the TFT-LCD panel 100, in order to display light of a back light in three colors, a color filter formed of cells of red (R), green (G), and blue (B) for each pixel is included. A black matrix exists between each cell of the pattern of a color filter, which blocks light passing through each of R, G, and B pixels to prevent interference with each other, absorbs external light which should not be reflected, and conceals TFTs, a gate line, and a source line.

In order to manufacture the described color filter, in general, a black matrix is formed and processes of applying color photoresist (PR), exposure, and development are performed. In the described method, since much manufacturing time is consumed and material is wasted, an inkjet printing method has been developed.

Figure 2:
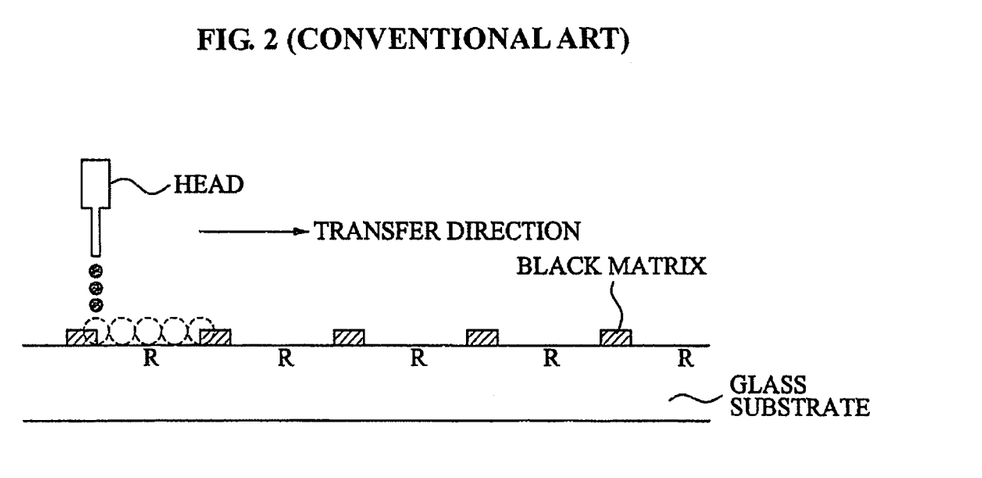
FIG. 2 is a diagram illustrating an inkjet printing method.

In the inkjet printing method, since a process is performed so that color filter cells of each of R, G, and B are printed via an inkjet head similar to drawing on a sheet, without a patterning process of removing PR, as shown in FIG. 2, manufacturing time may be notably reduced and material may be saved by the simplified process.

Figure 3:
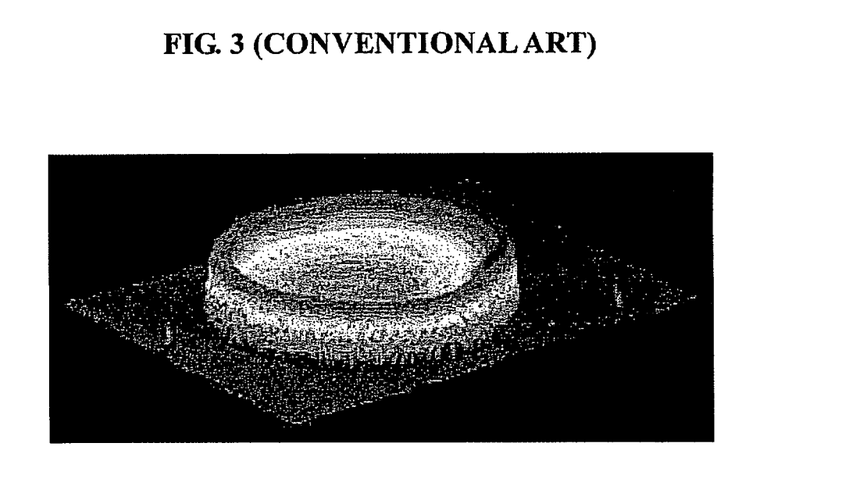
FIG. 3 is a diagram illustrating a color filter cell showing a coffee-ring phenomenon occurring.

However, in the general printing method, since each cell having a size 260*70*1 µm for a resolution higher than SVGA has to be filled with ink drops for each color filter cell, jetted between black matrixes, ink overflows from those cells with a depth of less than 1 µm to adjacent cells. Also, in the inkjet printing method, ink in each color filter cell does not have a uniform thickness, as shown in FIG. 3 and a coffee ring phenomenon in which peripheral ink is thicker than the center occurs, which is caused by non-uniform solvent evaporation of the ink.

Figure 4:
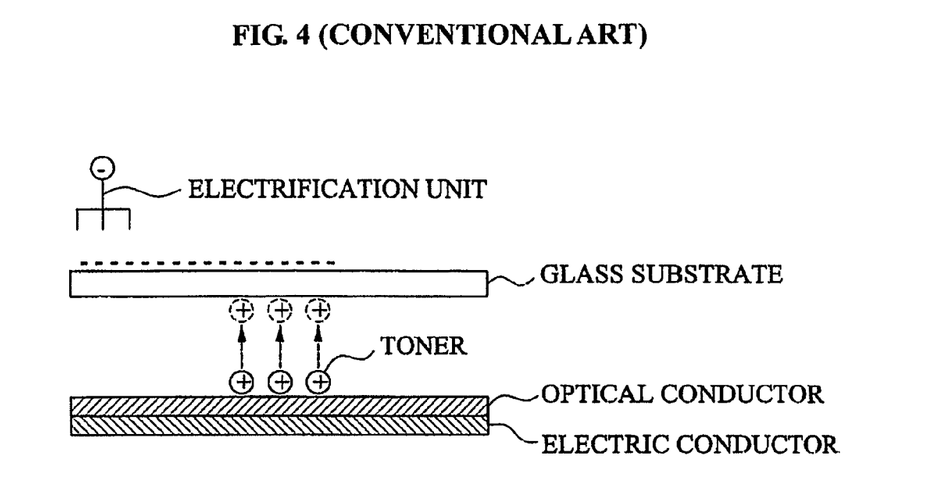
FIG. 4 is a diagram illustrating a conventional method of manufacturing a color filter by using electrostatic force.

FIG. 4 is a diagram illustrating a conventional method of manufacturing a color filter by using electrostatic force. Referring to FIG. 4, in order to form a color filter cell on a glass substrate, an electric conductor, for example, metal, on which an optical conductor, for example, indium-tin-oxide (ITO), is deposited, is required. In the conventional method of using electrostatic force, in order to form an electrostatic latent image in a relevant position of the optical conductor corresponding to the color filter cell, the surface of the optical conductor is exposed in order to be electrified in a pattern meeting certain LCD resolution standard requirements. If the electrostatic latent image of the certain resolution standard requirements is formed on the surface of the optical conductor, toner having an electric charge may be adsorbed to only a latent image by electrostatic force of the electrostatic latent image. Next, in the case the optical conductor to which the toner is adsorbed is transferred to be adjacent to the glass substrate and the glass substrate is electrified to have an electric charge opposite to the toner by using an electrification unit generating corona discharge, the toner of a relevant color is separated from the optical conductor and transcribed to the glass substrate. A more detailed description is disclosed in Japanese Patent Application No. 1995-281175 filed by Casio.

However, in the conventional method of manufacturing a color filter by using electrostatic force as shown in FIG. 4, an electric conductor on which an optical conductor is deposited is additionally required in the shape of a mask and two electrification processes, which are the electrification of the surface of the optical conductor before an exposure process, and the electrification of a glass substrate for transcription, are required, thereby increasing manufacturing cost and manufacturing time.

SUMMARY OF THE INVENTION

Additional aspects and/or advantages of the invention will be set forth in part in the description which follows and, in part, will be apparent from the description, or may be learned by practice of the invention.

The present invention provides an apparatus for manufacturing a color filter, which forms an electrostatic latent image of a predetermined resolution standard requirements on a glass substrate and enables toner nano-particles to be adsorbed to the latent image, in order to simplify the process and form color filter cells having a uniform thickness at an accurate position.

The present invention also provides a method of manufacturing a color filter, in which an electrostatic latent image of predetermined resolution standard requirements by using laser and toner nano-particles are adsorbed to the latent image by using electrostatic force.

According to an aspect of the present invention, there is provided an apparatus for manufacturing a color filter, including: a storage unit storing electrification data; a laser driver generating at least one laser control signal corresponding to the electrification data; a laser irradiation unit having at least one laser device, the at least one laser device irradiating a laser to a glass substrate for a predetermined time according to the at least one laser control signal outputted from the laser driver; at least one toner box disposed on the periphery of the glass substrate and providing toner with an electric charge opposite to electrostatic latent images formed in positions of color filter cells having a predetermined resolution standard requirements according to the irradiated laser, the toner adsorbed to the latent images; and a second laser irradiation unit melting the toner adsorbed to the glass substrate.

The laser irradiation unit may have at least one laser device for each of the color filter cells of a first color, a second color, and a third color and irradiate a laser to the glass substrate at the time determined according to the laser control signal corresponding to the at least one laser device for each the color. In this case, the laser irradiated for each of the color filter cells of the first color, the second color, and the third color is different from each other and each of the at least one toner box for each of the colors provides toner for each of the color filter cells of the first color, the second color, and the third color, with toner particle sizes different for each color.

According to another aspect of the present invention, there is provided a method of manufacturing a color filter, including: receiving electrification data; generating at least one laser control signal corresponding to the electrification data; forming electrostatic latent images in positions of color filter cells meeting certain resolution standard requirements by irradiating a laser to a glass substrate at a time determined according to the at least one laser control signal by using at least one laser device; providing toner with an electric charge opposite to the latent images, to be adsorbed to the electrostatic latent images; and melting the toner adsorbed to the glass substrate.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 5:
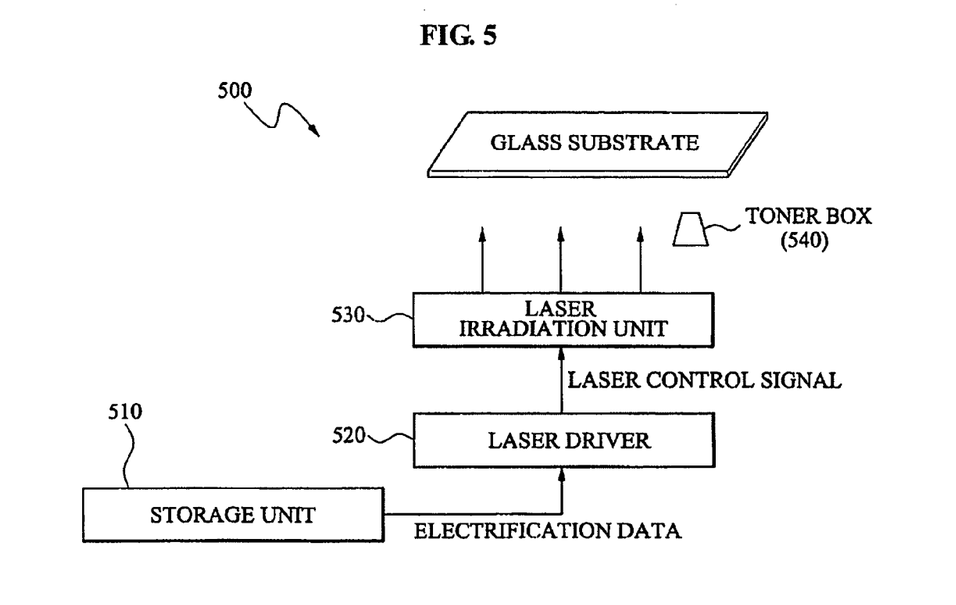
FIG. 5 is a block diagram illustrating an apparatus for manufacturing a color filter, according to an embodiment of the present invention.

FIG. 5 is a block diagram illustrating a color filter manufacturing apparatus 500 according to an embodiment of the present invention. Referring to FIG. 5, the color filter manufacturing apparatus 500 includes a storage unit 510, a laser driver 520, a laser irradiation unit 530, and a toner box 540.

The color filter manufacturing apparatus 500 is provided to be used in manufacturing a color filter capable of being used in thin film transistor-liquid crystal display (TFT-LCD) panels for mobile phones, digital cameras, computer screens, television screens, and other similar devices. The color filter manufacturing apparatus 500 may print color filter cells by using a laser printing method, namely, in which toner nano-particles are adsorbed to a glass substrate on which an electrostatic force is formed by laser.

This is, according to an embodiment of the present invention, different from a photoresist (PR) application method, a development method, and an inkjet printing method, in that a laser printer prints on a sheet and toner nano-particles for a color filter are printed on a glass substrate. In the described laser printing method, ink is not actively jetted from an ink cartridge to the glass substrate, the toner box 540 only passively provides the toner nano-particles having a predetermined electric charge, and the glass substrate on which electrostatic force is formed by laser attracts the toner nano-particles.

Accordingly, the color filter manufacturing apparatus 500 using the laser printing method may prevent an overflow of ink to adjacent pixels and also prevent a coffee-ring phenomenon. Also, an area of the glass substrate, which is scanned once, does not requires to be scanned again, thereby saving manufacturing time, and a process simplification may be expected because an electrostatic latent image is directly formed on the glass substrate as described below. Also, since laser power and a laser irradiation position are determined by electrification data downloaded from the storage unit 510 to the laser driver 520, if resolution of a TFT-LCD panel is changed, subsequent color filters may be manufactured by modifying only the electrification data.

Figure 6:
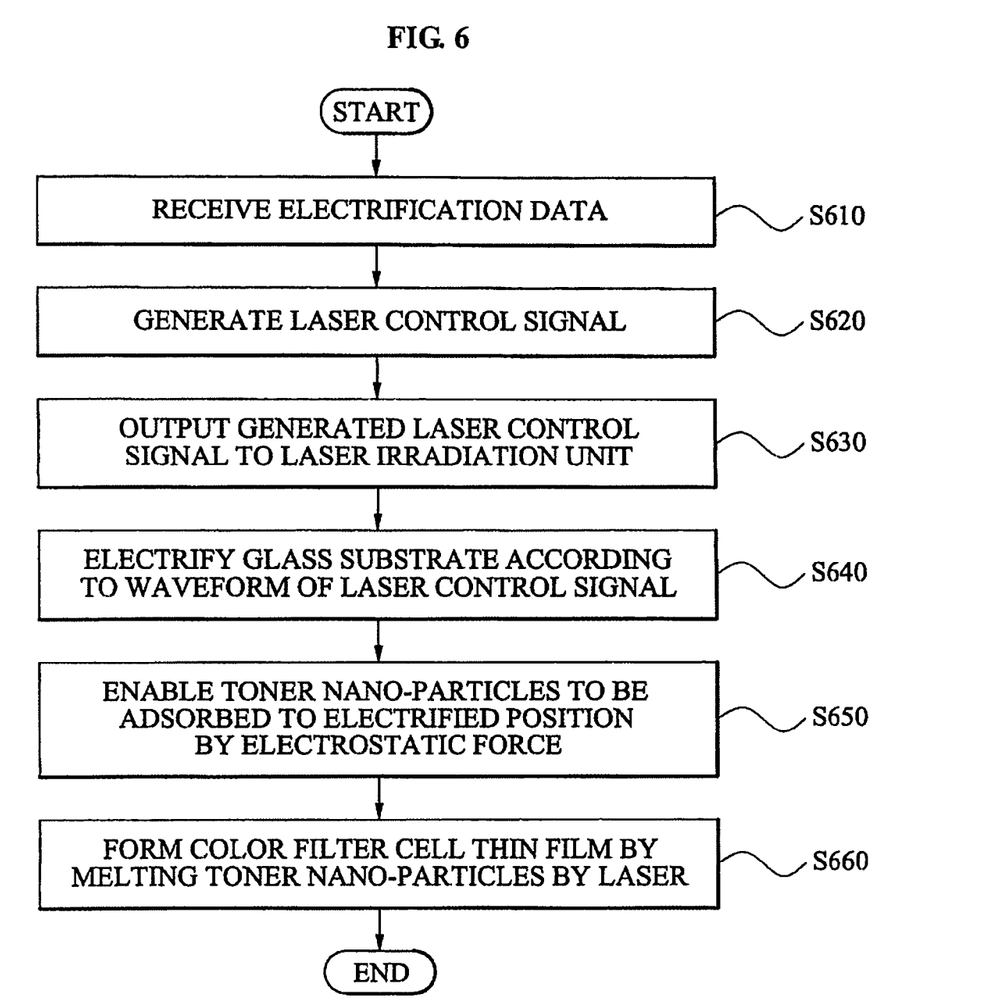
FIG. 6 is a flowchart illustrating the operations of the apparatus of FIG. 5.

FIG. 6 is referred to for explaining the operations of the color filter manufacturing apparatus of FIG. 5.

Electrification data for irradiating a laser of a certain power on a certain position of the glass substrate by the laser irradiation unit 530 is stored in the storage unit 510. Namely, the electrification data stored in the storage unit 510 is determined by a position in which pixels having certain resolution standard requirements are located, namely, a position electrified by laser irradiation for a relevant color filter cell. Also, in order to determine the power of the irradiated laser, the electrification data may include the size of the cell according to the resolution standard requirements or information on colors for each position.

The laser driver 520 receives the electrification data from the storage unit 510 (Operation 610). Accordingly, the laser driver 520 generates at least one laser control signal corresponding to the received electrification data (Operation 620). The laser control signal has a certain waveform active in a position in which the glass substrate is electrified according to the relevant electrification data. The laser control signal may be the form of a pulse having a certain frequency according to periodically repeatedly electrified position.

The at least one laser control signal generated as described is outputted to at least one laser device forming the laser irradiation unit 530 (Operation 630). In the case a plurality of laser devices are included in the laser irradiation unit 530, the laser driver 520 may generate a respective laser control signal for each relevant laser device.

Figure 8:
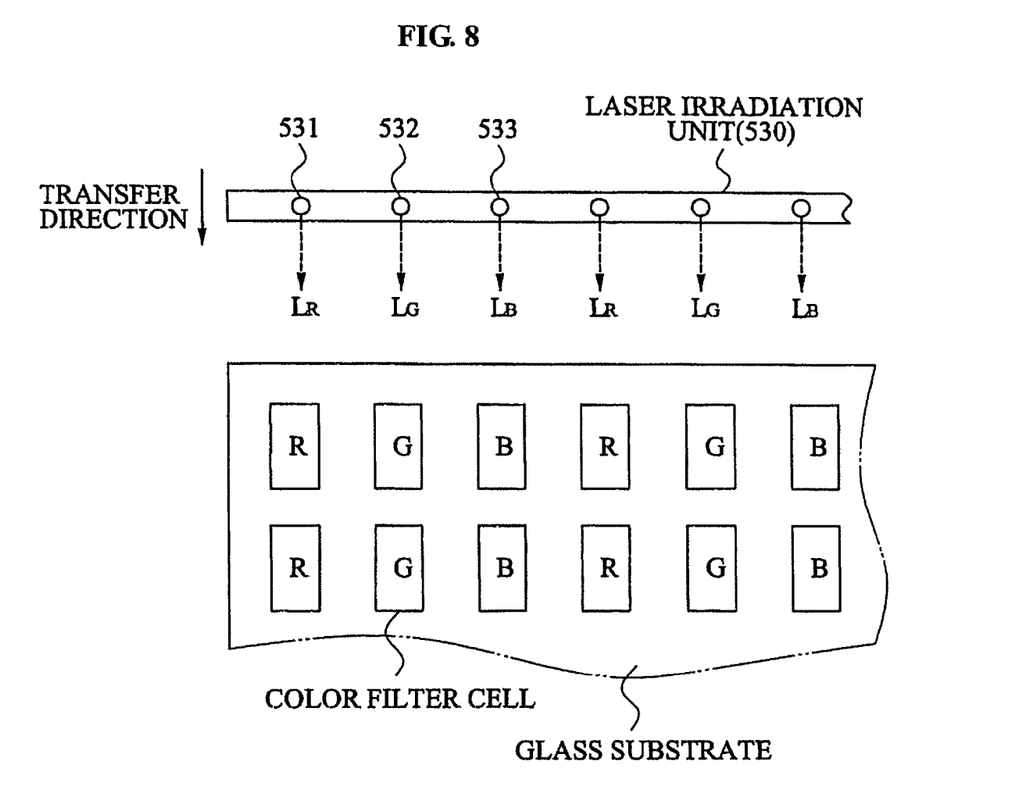
FIG. 8 is a diagram illustrating a method of manufacturing a color filter by a plurality of laser devices to shorten manufacturing time.

The at least one laser device of the laser irradiation unit 530 irradiates a laser of a certain power at a time determined according to a relevant laser control signal outputted from the laser driver 520, thereby electrifying positions of color filter cells meeting certain resolution standard requirements (Operation 640). In the case a plurality of laser devices is included in the laser irradiation unit 530, for example, as shown in FIG. 8, the laser irradiation unit 530 may have at least one laser device for each color filter cell of red (R), green (G), and blue (B), (531 to 533 shown in FIG. 8). Accordingly, the laser control signal corresponding to the at least one laser device for each of the colors is received from the laser driver 520 and each of the laser devices may irradiate a laser to the glass substrate at the time determined according to the relevant laser control signal.

Before the laser is irradiated, the black matrix disposed between the color filter cells may be previously formed on the glass substrate. As is well-known, the black matrix may increase luminance by preventing random reflection of light in a color filter applied to a TFT-LCD.

Figure 7:
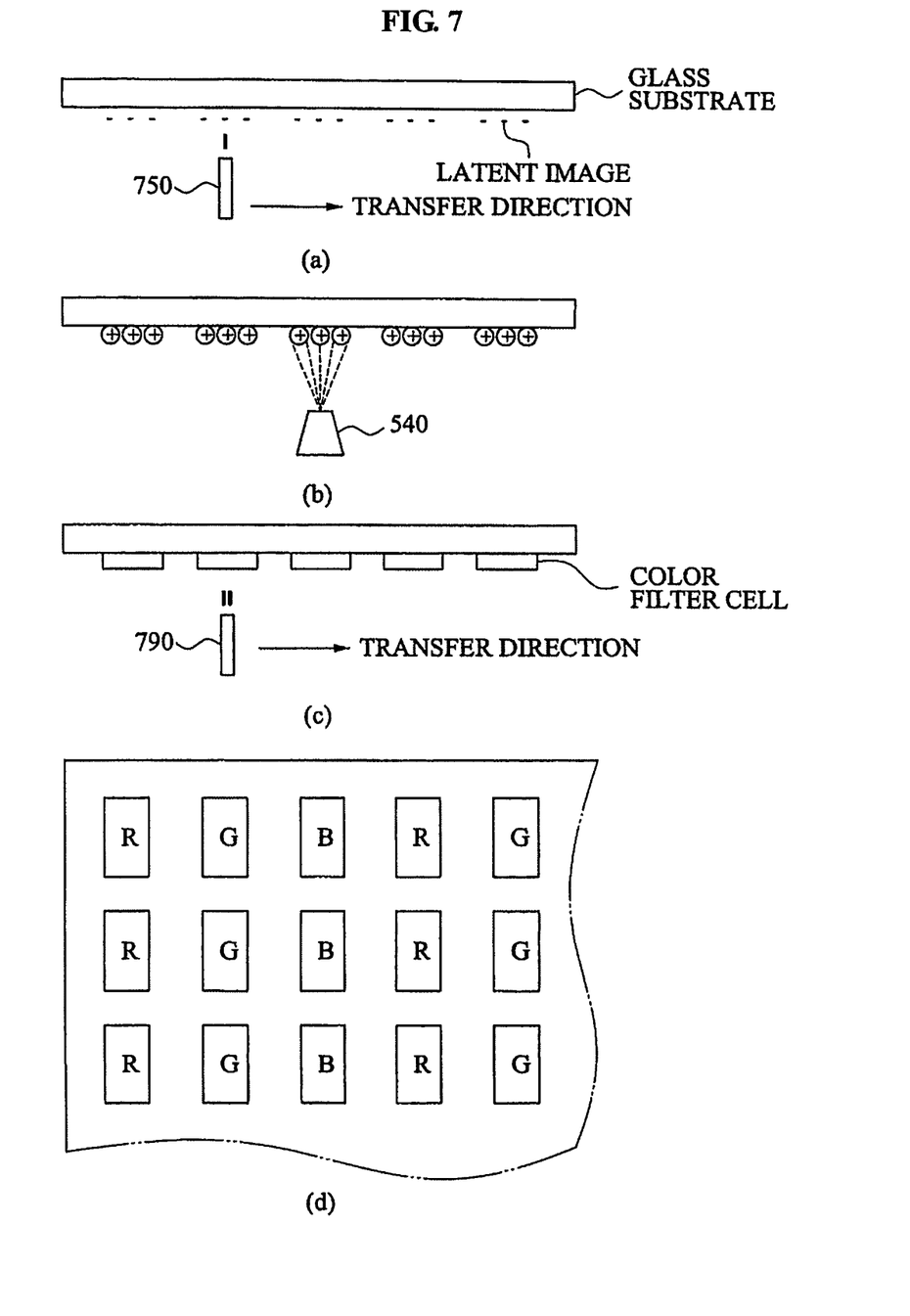
FIG. 7 is a diagram illustrating processes of generating electrostatic force and adsorbing toner nano-particles.

The glass substrate is electrified according to the irradiated laser, as (a) of FIG. 7, electrostatic latent images may be formed in positions of the color filter cells meeting the certain resolution standard requirements on the glass substrate. In this case, a certain photosensitive film improving photosensitivity with respect to laser may be previously coated on the glass substrate to which the laser is irradiated.

Also, as described above, it may be desirable that the surface of the glass substrate is previously electrified to have an electrostatic latent image having the uniform electric charge, for example, positive electric charge on the glass substrate including the case of coating the photosensitive film. Electrostatic charges randomly formed on the glass substrate may make cell selectivity to be worse in a later toner adsorption procedure. In this case, in the case the surface of the glass substrate is previously electrified to have the uniform electric charge, for example, positive charge, the laser is irradiated by selective control of the relevant laser control signal according to Operation 640, thereby making the latent image in positions of pixels to have opposite charges, for example, negative charges.

To manufacture a certain color filter meeting the resolution of a TFT-LCD panel, positions in which the electrostatic latent images are formed by electrification according to Operation 640 is determined by standard requirements of a pixel array according to the resolution. As (d) of FIG. 7, to form pixels periodically duplicated at a regular interval according to a pixel array according to certain resolution, in the case the glass substrate or the laser irradiation unit 530 is transferred by a certain transfer unit (not shown) at a certain velocity, laser devices 750 of the laser irradiation unit 530 irradiate a laser to a position of a color filter cell of a relevant color. The laser devices 750 of the laser irradiation unit 530 irradiate the laser to a periodically duplicate position to be electrified, according to the laser control signal having the form of a pulse having a certain frequency from the laser driver 520, at a time determined according to the laser control signal.

On the other hand, toner nano-particles are adsorbed by electrostatic force of the electrostatic latent images of the electrified positions on the glass substrate as described above (Operation 650). In (b) of FIG. 7, the toner box 540 provides toner particles with charges opposite to the electrostatic latent images and is disposed adjacent to the glass substrate so that the toner particles can be drawn by the electrostatic force of the electrostatic latent images. As a printing method of a laser printer, when the glass substrate or the laser irradiation unit 530 is transferred at a certain velocity and the laser devices 750 of the laser irradiation unit 530 irradiate a laser, a process may be summarily performed such that a position to which the laser is irradiated receives toner particles from the toner box 540. Namely, after all the relevant positions of the glass substrate are laser-scanned to be entirely electrified, a process of adsorbing the toner may be performed in another unit but the toner box 540 is disposed close to the glass substrate so that the toner particles are attracted by the electrostatic force, thereby immediately performing the process of adsorbing the toner after electrification of the relevant color filter cells on the glass substrate.

Next, after the toner particles are adsorbed to the glass substrate, as (c) of FIG. 7, the laser-scan process is once again performed so that the toner nano-particles are melted to form a thin film, thereby creating a color filter in the form of (d) of FIG. 7 (Operation 660). As a different method from Operation 630, in which the laser irradiation unit 530 irradiates a laser according to the laser control signal, a scan process may enable the toner particles adsorbed to the glass substrate to be melted to form a certain thin film by irradiating a laser of a certain power to the surface of the glass substrate according to a certain form. For the laser irradiation in this case, the laser irradiation unit 530 may be used or another laser irradiation unit 790 having a large beam may be used.

FIG. 8 is a diagram illustrating a method of manufacturing a color filter by using a plurality of laser devices to reduce manufacturing time. As shown in FIG. 8, to manufacture a color filter cell in a stripe arrangement having the same color pattern in a lengthwise direction, the laser irradiation unit 530 may have a plurality of laser devices 531 to 533.

Namely, the laser irradiation unit 530 may have at least one laser device for each R, G, and B color filter cells. For example, in the case at least one laser device 531 for the color filter cells of R, at least one laser device 532 for the color filter cells of G, and at least one laser device 533 for the color filter cells of B are all included, each of the laser devices 531 to 533, for each of the colors, may irradiate a laser to the glass substrate at a time determined according to a relevant laser control signal corresponding to the laser devices 531 to 533. Accordingly, with one scan, electrostatic latent images for all three color filter cells are formed on the glass substrate and the toner particles of the relevant color are adsorbed to the electrostatic latent images, thereby completing to form three color filters.

In this case, a classification of the cells for each color may be performed by the strength of an electric filed of the charges forming the electrostatic latent image. The strength of the electric field of the electrostatic latent image for each color may be controlled by the power of the laser irradiated to the glass substrate. For example, in the case the size of the laser control signal received from the laser driver 520 is large, the laser device receiving the relevant signal may form electric charges having great electrostatic force on the glass substrate, and in the case the laser control signal received from the laser driver 520 is small, the laser device receiving the relevant signal may form electric charges having small electrostatic force on the glass substrate.

Figure 9:
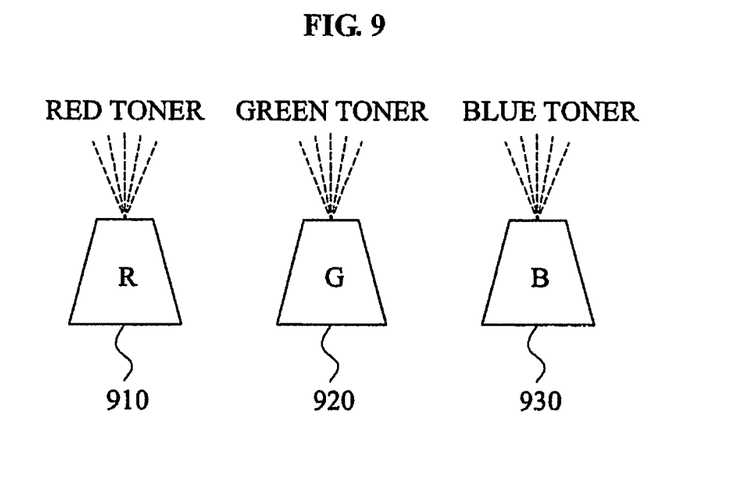
FIG. 9 is a diagram illustrating an example of toner boxes for printing three colors at the same time.

Accordingly, the electrostatic latent images having electrostatic force different for each color adsorb different sized toner nano-particles. For example, in the toner box 540 of FIG. 5, three toner boxes 910 to 930, as shown in FIG. 9, for simultaneously printing three colors may be included. In FIG. 9, each toner boxes provides toner having particles whose size is different from each other. For example, toner of R may be formed of 1 nanometer (nm) particles, toner of G may be formed of 2 nm particles, and toner of B may be formed of 3 nm particles. In this case, a latent image having smallest electrostatic force is formed in a position of R since laser $L_R$ is provided with the smallest power, a latent image having moderate electrostatic force is formed in a position of G since laser $L_G$ is provided with moderate power, and a latent image having greatest electrostatic force is formed in a position of B since laser $L_B$ is provided with the greatest power, the toner particles having different size or weight may be adsorbed according to each electrostatic force.

In FIG. 8, only one laser device for any one colors may be included from the at least one laser device 531 for the color filter cells of R, the at least one laser device 532 for the color filter cells of G, and the at least one laser device 533 for the color filter cells of B. In this case, performing the process of forming the latent images by the laser (referring to (a) of FIG. 7), the process of adsorbing the toner (referring to (b) of FIG. 7), and the process of forming the thin film by the laser (referring to (c) of FIG. 7), completing the color filter cells of any one of the colors, for example, R, and performing the same processes on the other two color, completes the whole three color filter having R, G, and B color filter cells. It is also understood that not only the tree color filter having R, G, and B filter cells but also Y(Yellow), M(Magenta), and C(Cyan) color cells can be used to make a color filter.

Figure 10:
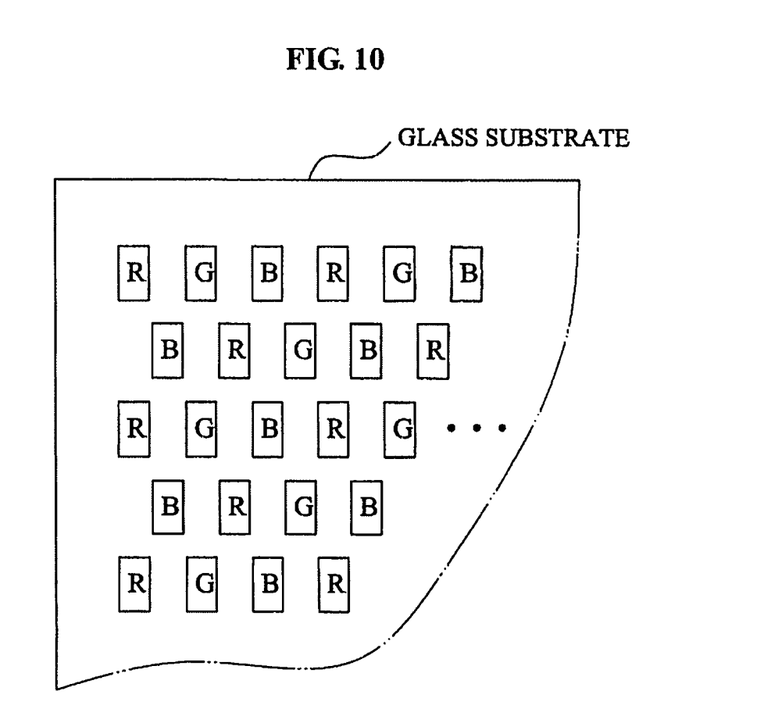
FIG. 10 is a diagram illustrating a method of manufacturing a color filter having a triangular arrangement, according to the present invention.

Hitherto, it has been stated that the color filter cells of each of the colors have the same color pattern in a lengthwise direction. However, not defined by the description above, the laser printing method according to the present invention may be applied to a color filter having a triangle arrangement as shown in FIG. 10. From standard requirements of color filter cells in the triangular arrangement, such as the size of the color filter cells, the size of the black matrix, and pitch width and length of the cell, relevant electrification data may be configured similar to the color filter having the stripe arrangement by those skilled in the art. Accordingly, if the color filter has the triangle arrangement, latent images may be precisely formed on a position of each cell by the laser driver 520 and the laser irradiation unit 530 operated by the configured electrification data.

As described above, in the color filter manufacturing apparatus 500, the laser driver 520 generates at least one laser control signal according to the electrification data and at least one laser device forming the laser irradiation unit 530 irradiates a laser at a certain period determined according to the at least one laser control signal. Electrostatic latent images are formed on positions of color filter cells meeting certain resolution standard requirements in a glass substrate by the irradiated laser, and toner nano-particles are electrostatically adsorbed to the formed electrostatic latent images.

As described above, in the color filter manufacturing apparatus according to the present invention, since the toner nano-particles are electrostatically adsorbed to the latent image directly formed on the glass substrate, the manufacturing process may become simplified, ink may not overflow to neighboring pixels, and a filter cell whose material has a uniform thickness may be formed at a precise position of a color filter cell. Also, according to the laser printing method, an area of the glass once scanned is not required to be scanned again, thereby saving manufacturing time, and, if a resolution of a TFT-LCD panel changes, corresponding color filters may be manufactured by only correcting electrification data.

Also, the embodiments of the present invention include a computer readable medium including a program instruction for executing various operations realized by a computer. The computer readable medium may include a program instruction, a data file, and a data structure, separately or cooperatively. The program instructions and the media may be those specially designed and constructed for the purposes of the present invention, or they may be of the kind well known and available to those skilled in the art of computer software arts. Examples of the computer readable media include magnetic media (e.g., hard disks, floppy disks, and magnetic tapes), optical media (e.g., CD-ROMs or DVD), magneto-optical media (e.g., floptical disks), and hardware devices (e.g., ROMs, RAMs, or flash memories, etc.) that are specially configured to store and perform program instructions. The media may also be transmission media such as optical or metallic lines, wave guides, etc. including a carrier wave transmitting signals specifying the program instructions, data structures, etc. Examples of the program instructions include both machine code, such as produced by a compiler, and files containing high-level languages codes that may be executed by the computer using an interpreter. The hardware elements above may be configured to act as one or more software modules for implementing the operations of this invention, and the inverse is also true.

While this invention has been particularly shown and described with reference to preferred embodiments thereof, various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An apparatus for manufacturing a color filter, comprising:
   a storage unit storing electrification data;
   a laser driver generating at least one laser control signal corresponding to the electrification data;
   a laser irradiation unit having at least one laser device, the at least one laser device irradiating a laser onto a glass substrate for a predetermined time according to the at least one laser control signal outputted from the laser driver;
   at least one toner box disposed on the periphery of the glass substrate and providing a toner; and
   electrostatic latent images formed in positions of color filter cells according to predetermined resolution standard requirements are formed directly on a surface of the glass substrate, and the toner provided by the at least one toner box has an electric charge opposite to the electrostatic latent images.

2. The apparatus of claim 1, further comprising a second laser irradiation unit melting the toner adsorbed to the glass substrate.

3. The apparatus of claim 1, wherein, before the electrostatic latent images are formed in the positions of the color filter cells having the predetermined resolution standard requirements by the irradiation of the laser, the surface of the glass substrate is electrified by a uniform electric charge.

4. The apparatus of claim 1, wherein the laser irradiation unit having at least one laser device for each of the color filter cells of a first color, a second color, and a third color and irradiating laser to the glass substrate for a predetermined time according to the laser control signal corresponding to the at least one laser device for each the color.

5. The apparatus of claim 4, wherein the power of the laser irradiated for each of the color filter cells of the first color, the second color, and the third color is different from each other and each toner box for each of the colors as the at least one toner box provides toner having a particle size different from each other, for each of the color filter cells of the first color, the second color, and the third color.

6. The apparatus of claim 4, wherein the first color, the second color, and the third color are red, green, and blue and the color filter cells of each of the colors are printed in a stripe arrangement having the same color pattern in a predetermined direction.

7. The apparatus of claim 1, wherein the toner comprises nano-particles.

8. An apparatus for manufacturing a color filter, comprising:
   a storage unit storing electrification data;
   a laser driver generating at least one laser control signal corresponding to the electrification data;
   a laser irradiation unit having at least one laser device, the at least one laser device irradiating a laser onto a glass substrate for a predetermined time according to the at least one laser control signal outputted from the laser driver;
   at least one toner box disposed on the periphery of the glass substrate and providing a toner; and
   electrostatic latent images formed in positions of color filter cells according to predetermined resolution standard requirements are formed directly on at least one of a surface of the glass substrate and a surface of the glass substrate coated with a photosensitive film improving photosensitivity with respect to the laser by the irradiated laser, and the toner provided by the at least one toner box has an electric charge opposite to the electrostatic latent images,
   wherein the strength of electric field formed by the electrostatic latent image for each of the color filter cells of a first color, a second color, and a third color is different from each other.

9. The apparatus of claim 8, wherein the strength of the electric field is controlled by the power of the irradiated laser.

10. The apparatus of claim 8, wherein the size of the toner particles for each of the color filter cells of the first color, the second color, and the third color is different from each other.

11. A method of manufacturing a color filter, comprising:
    receiving electrification data;
    generating at least one laser control signal corresponding to the electrification data;
    forming electrostatic latent images in positions of color filter cells having predetermined resolution standard requirements by irradiating a laser to a glass substrate for a predetermined time according to the at least one laser control signal by using at least one laser device; and
    providing toner with an electric charge opposite to the latent images, to be adsorbed to the electrostatic latent images,
    wherein the electrostatic latent images formed in positions of color filter cells according to predetermined resolution standard requirements are formed directly on a surface of the glass substrate by the irradiated laser.

12. The method of claim 11, further comprising melting the toner adsorbed to the glass substrate.

13. The method of claim 11, wherein, before the electrostatic latent images are formed in the positions of the color filter cells having the predetermined resolution standard requirements by the irradiating laser, the surface of the glass substrate is electrified by a uniform electric charge.

14. The method of claim 11, wherein the laser is irradiated to the glass substrate for a predetermined time according to the laser control signal corresponding to the at least one laser device for each of the colors by using the at least one laser device for each of the color filter cells of the first color, the second color, and the third color.

15. The method of claim 14, wherein the power of the laser irradiated for each of the color filter cells of the first color, the second color, and the third color is different from each other and toner having a particle size different from each other is provided to form each of the colors to the electrostatic latent images formed with electric field strength different from each other for each color on the glass substrate.

16. The method of claim 14, wherein the first color, the second color, and the third color are red, green, and blue and the color filter cells of each of the colors are printed in a stripe arrangement having the same color pattern in a certain direction.

17. The method of claim 14, wherein the first color, the second color, and the third color are red, green, and blue and the color filter cells of each of the colors are printed in a triangle arrangement.

18. A non-transitory computer readable recording medium in which a program for executing the method according to claim 11 is recorded.

19. A method of manufacturing a color filter, comprising:
    receiving electrification data;
    generating at least one laser control signal corresponding to the electrification data;
    forming electrostatic latent images in positions of color filter cells having predetermined resolution standard requirements by irradiating a laser to a glass substrate for a predetermined time according to the at least one laser control signal by using at least one laser device; and
    providing toner with an electric charge opposite to the latent images, to be adsorbed to the electrostatic latent images,
    wherein the electrostatic latent images formed in positions of color filter cells according to predetermined resolution standard requirements are formed directly on at least one of a surface of the glass substrate and a surface of the glass substrate coated with a photosensitive film improving photosensitivity with respect to the laser by the irradiated laser,
    wherein the strength of an electric field formed by the electrostatic latent image for each of the color filter cells of a first color, a second color, and a third color is different from each other.

20. The method of claim 19, wherein the strength of the electric field is controlled by the power of the irradiated laser.

21. The method of claim 19, wherein the size of toner particles for each of the color filter cells of the first color, the second color, and the third color is different from each other.

* * * * *

UNITED STATES PATENT AND TRADEMARK OFFICE
CERTIFICATE OF CORRECTION

PATENT NO. : 8,758,965 B2  
APPLICATION NO. : 11/440023  
DATED : June 24, 2014  
INVENTOR(S) : Tae Gyu Kim Page 1 of 1

It is certified that error appears in the above-identified patent and that said Letters Patent is hereby corrected as shown below:

In the Claims

Column 9, Line 57, In Claim 11, after "glass" delete "substrate by the irradiated laser." and insert -- substrate. --, therefor.

Signed and Sealed this
Twenty-eighth Day of October, 2014

Michelle K. Lee
*Deputy Director of the United States Patent and Trademark Office*